United States Patent
Massa De Campos et al.

(10) Patent No.: US 9,926,761 B2
(45) Date of Patent: Mar. 27, 2018

(54) ADVANCED AUTOMATED CONTROL SYSTEM FOR MINIMIZING SLUGGING

(71) Applicant: PETROLEO BRASILEIRO S.A.—PETROBRAS, Rio de Janeiro, RJ (BR)

(72) Inventors: Mario Cesar Mello Massa De Campos, Rio de Janeiro (BR); Alex Furtado Teixeira, Rio de Janeiro (BR); Oscar Felippe Von Meien, Rio de Janeiro (BR); Alberto Sant'Anna Stender, Rio de Janeiro (BR); Saul Simoes Neto, Rio de Janeiro (BR)

(*) Notice: Subject to any disclaimer, the term of this patent is extended or adjusted under 35 U.S.C. 154(b) by 0 days.

(21) Appl. No.: 14/648,594

(22) PCT Filed: Sep. 10, 2014

(86) PCT No.: PCT/BR2014/000320
§ 371 (c)(1),
(2) Date: May 29, 2015

(87) PCT Pub. No.: WO2015/077854
PCT Pub. Date: Jun. 4, 2015

(65) Prior Publication Data
US 2015/0368999 A1    Dec. 24, 2015

(30) Foreign Application Priority Data
Nov. 28, 2013 (BR) .............................. 102013030571

(51) Int. Cl.
*E21B 33/035* (2006.01)
*E21B 34/04* (2006.01)
(Continued)

(52) U.S. Cl.
CPC .......... *E21B 33/0355* (2013.01); *E21B 34/04* (2013.01); *E21B 43/12* (2013.01); *E21B 47/06* (2013.01); *G05B 11/36* (2013.01)

(58) Field of Classification Search
CPC ...... E21B 33/0355; E21B 34/04; E21B 43/12; E21B 44/00; E21B 47/06; G05B 11/36
(Continued)

(56) References Cited

U.S. PATENT DOCUMENTS

| 6,041,803 A | 3/2000 | De Almeida et al. |
| 2006/0122734 A1* | 6/2006 | Coward ............... G05D 7/0635 700/282 |

(Continued)

FOREIGN PATENT DOCUMENTS

| BR | PI 9913875-1 A | 11/2001 |
| BR | PI 0518401-0 A2 | 11/2008 |

*Primary Examiner* — Kenneth M Lo
*Assistant Examiner* — Yuhui R Pan
(74) *Attorney, Agent, or Firm* — Sughrue Mion, PLLC (57) ABSTRACT

Slugging of fluids produced in petroleum wells creates major disturbances for production rigs, and leads to major variation in process pressures and levels. In many cases, these disturbances cause unscheduled production stops, and in others may damage equipment such as heat exchangers. Thus slugging may have a major impact on the reliability of the operation, as it may affect product availability and quality (BSW, TOG and Moisture). Therefore, there is a complex control problem to use measurements to dynamically act on the production choke valves to set a new type of flow, without major slugging. The purpose of this invention is to provide an Advanced Automated Control System for minimizing slugging that can quickly act to avoid this type of flow as well as protect the process equipment. This system is comprised of sensors, valves and numerous PID or ONFC type controllers using aggregate computer algorithms to monitor a set of operating variables that enable diagnosing (Continued)

and controlling production well slugging. This advanced control system is efficient and eliminates or minimizes slugging during production well operation.

14 Claims, 6 Drawing Sheets

(51) Int. Cl.
  *E21B 47/06* (2012.01)
  *G05B 11/36* (2006.01)
  *E21B 43/12* (2006.01)

(58) Field of Classification Search
  USPC .......................................................... 700/282
  See application file for complete search history.

(56) References Cited

U.S. PATENT DOCUMENTS

| | | | |
|---|---|---|---|
| 2010/0307598 A1* | 12/2010 | Cao | B01D 19/0063 137/2 |
| 2011/0048544 A1* | 3/2011 | Calvert | E21B 43/12 137/7 |
| 2013/0211602 A1* | 8/2013 | Scheu | G05B 11/01 700/282 |

* cited by examiner

Anti-Slugging Control System  On/Off Switch

| Well | Anti-Slugging Control System - Position of the Choke Valve System | | | | |
|---|---|---|---|---|---|
| | Minimum | Maximum | Desired SP | Current Position of Check Valve | Enable |
| 01 | | | | | ☒ |
| 02 | | | | | ☒ |
| 03 | | | | | ☒ |

ADVANCED AUTOMATED CONTROL SYSTEM FOR MINIMIZING SLUGGING

CROSS REFERENCE TO RELATED APPLICATIONS

This is a National Stage of International Application No. PCT/BR2014/000320 filed Sep. 10, 2014, the contents of which are incorporated herein by reference in their entirety.

FIELD OF THE INVENTION

The present invention describes an advanced automated control system to eliminate or minimize a phenomenon known as slugging in deepwater oil wells.

BACKGROUND OF THE INVENTION

A major challenge for producing crude oil in deep waters is the result of severe instability resulting from what is known as slugging.

This phenomenon varies during the lifetime of the platform, since it depends on a number of factors such as the pressure in the reservoir and lines, the size of the lines, the composition of the multiphase fluid (water content), and the aperture of the well's top-side choke valve, among others.

The use of advanced control techniques to eliminate or minimize slugging has great potential for increasing the output of these units, as well as for making the entire process more stable, minimizing product flaring and unscheduled stops.

A simplified explanation of slugging is the following:— since the platforms are located kilometers away from the wells, as the fluid flows through the pipelines, it can give rise to a phenomenon known as slugging, with periods during which fluids accumulate in the risers and only a limited amount reaches the platform, and other periods in which large amounts of fluid (slugging) reach the platform.

The submerged pipelines, particularly those commonly referred to as flow lines and, in particular, those pipelines that run from the production wells to the loading sites can be susceptible to accumulation or retention of material that produces the slugging phenomenon when it is released.

As a rule, said flow lines extend for thousands of meters along the ocean floor, making the job of identifying and controlling these production intermittences even more critical.

Worsening the problem, often the flow line is several meters below the waterline, and a vertical leg or bypass may be required, along with other measures to re-establish suitable flow to the surface.

These problems are worsened when the production lines have descending sections and the top-side facilities do not have large capacitance (or volume) to absorb such disturbances, which may lead to a large number of unscheduled stops due to excessively large volumes in the separators.

Another loss point is that these oscillations result in a mean flow that is less than the potential flow of the lines.

When there is slugging during production, the bottom hole pressure is found to vary from high (due to accumulated liquid—greater loss of hydrostatic pressure and load) to low.

Thus, the flow also varies, with the mean flow possibly being considerably less than the potential flow. For this reason, developing advanced automated control systems to avoid slugging could result in considerable gains for platform operation.

The main object of the present invention is to provide a system that automatically controls and ensures the operation and production in deepwater petroleum wells without the incidence of slugging, by using pressure gauges in numerous alternative points of the flow line, and continuously acting on the production choke valves using aggregate computer algorithms that monitor a set of operating variables.

As advantages for the system of the present invention we have fewer losses due to flaring and fewer unscheduled production stops; the production is optimized by reducing well and processing plant start-up and stopping times due to unexpected slugging in the production wells, and the transients generated in the procedures required to return to production are also optimized; the result is the unit stabilization and an increased equipment lifetime and safety.

These and other advantages are achieved as the system of the present invention "automates" the operational best practices.

Traditionally, there is a paradigm in the prior art that so long as the choke valve on the top-side of the well is kept in the full-open position, the well will be producing at the maximum output.

However, this is not always true, especially in the face of instabilities such as those discussed above.

For instance Hu, B. (2004) in "*Characterizing gas-lift instabilities*", Department of Petroleum Engineering and Applied Geophysics, Norwegian University of Science and Technology, Ph.D. Thesis, NTNU, 2004, shows that a control system acting on the top-side choke valve stabilized the process and increased output by 17%. Also consider that, in this case, the mean bottom hole pressure is lower.

The literature has numerous other examples showing a potential gain in output from using different types of technologies aimed to control slugging in petroleum production wells.

Brazilian patent PI9913875-1, filed on Sep. 10, 1999, and its corresponding U.S. Pat. No. 6,041,803 filed on Mar. 28, 2000 describe a method to eliminate severe slugging in multiphase flow lines, and an associated device located near to the point of junction of the flow line, introducing a pressure drop into the flow. However, this document does not consider controlling the choke valve on the wet tree or upstream of the choke valve to control and reduce slugging.

Brazilian document PI0518401-0 describes another prior art attempt to control slugging, and concerns a method and device to control the formation of liquid or gas accumulations in the flow lines by injecting a surface tension reducing agent such as a foamant. A control unit is mentioned, but the aim of said control unit is to control the device, injecting the surface tension reducing agent. Likewise, that document does not include the pressure control proposed in the present invention by monitoring the choke valve on the wet tree or upstream from the choke valve, and the use of computer algorithms to monitor a set of operating variables.

In his Ph.D. Thesis entitled "*Severe Slugging Elimination in Ultra Deep Water Tiebacks and Risers*" University of Tulsa—College of Engineering and Natural Sciences—Petroleum Engineering, published on Oct. 7, 2002, Jarl Oystein Tengesdal finds that by creating a small additional pressure drop using a choke valve one can eliminate severe slugging. Tests are conducted considering flow points totally or partially obstructed by severe slugging.

As seen, the type of flow known as slugging in the fluids produced in producing oil wells creates major disturbances for production platforms, and causes major variation in process pressures and levels.

In many cases, these disturbances lead to unscheduled production stops, and in others may damage equipment, such as heat exchangers.

Thus, slugging have a major impact on the reliability of the operation, as they affect product availability and quality (BSW, TOG and Moisture).

Therefore, there exists a complex control problem, which is to use measurements to dynamically act on the production choke valves to generate a new type of flow, without major slugging.

Adopting the system of the present invention will allow platforms to be more stable and consequently increasing their output by implementing an advanced anti-slugging control system.

This technology will also impact production, minimizing losses with fewer unscheduled stops.

SUMMARY OF THE INVENTION

The advanced automated system to minimize slugging described in the present invention was developed for deepwater petroleum production where there are severe instabilities due to slugging, with bottom hole pressures varying from high to low, said system being comprised of reading the position (setting) of the production control choke valve—PV-01 using a controller ZIC-01, responsible for keeping said valve at the desired setting for operation; controlling well pressure via pressure controllers PIC-01 and PIC-02 downstream from the choke valve, to control choke valves PV-01, where controller PIC-02 is a maximum pressure controller activated via a low signal selector; a controller ZIC-01 defines the setpoint for pressure controller PIC-01; an HS switch selects the signal (PV) for the anti-slugging control device PIC-01, which allows the operator to select the control variable; a sensor ZT-01 in a transport zone, and a pressure sensor PT-02 downstream from the production choke valve.

BRIEF DESCRIPTION OF THE DRAWINGS

The present invention can be better understood from the drawings that illustrate the anti-slugging advanced control system, where.

DETAILED DESCRIPTION OF THE INVENTION

The Advanced Automated System to Control and Minimize Slugging of the present invention is capable of eliminating slugging, minimizing the problems associated with severe slugging, and the potential lack of control in plants, which in turn can lead to burning hydrocarbons in the platform flare.

One normally measures the pressure and temperature in production wells (PDG—Permanent Downhole Gauge), at the wet Christmas tree (TPT—Temperature and Pressure Transducer) and on arrival at the platform.

Using the system of the present invention, given these readings, operators can set the production choke valve at a position that will minimize slugging.

Figure 2:
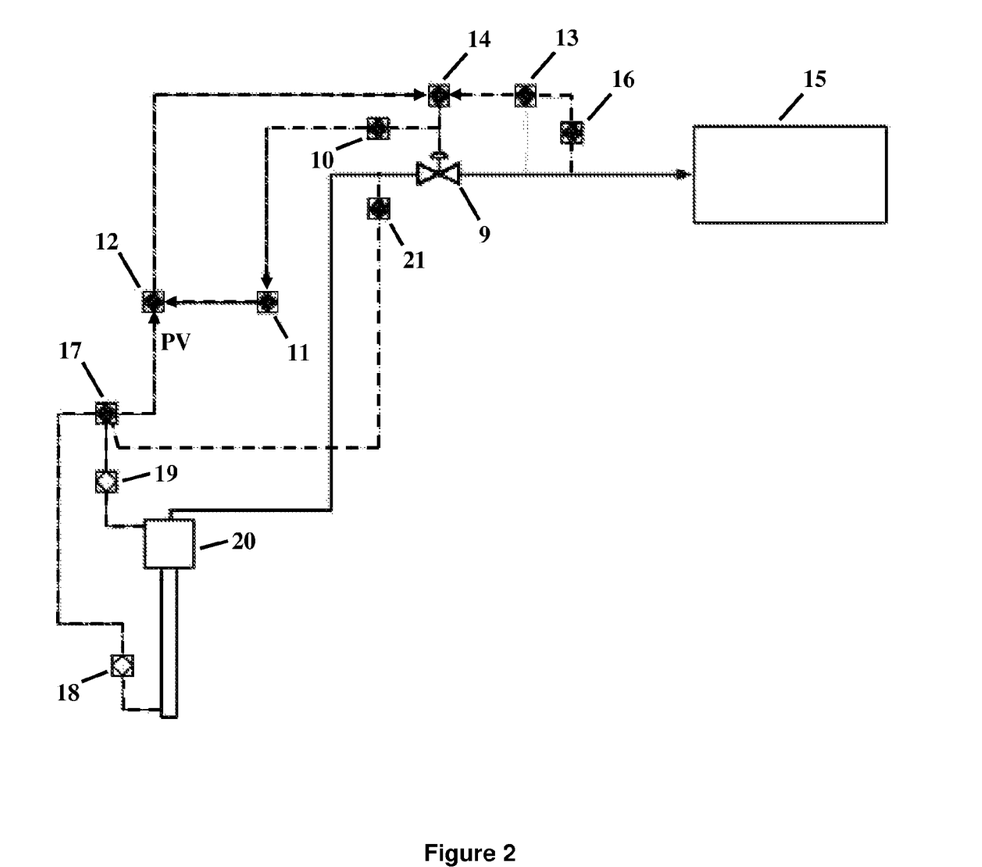
FIG. 2—is a schematic drawing of the sensors, valves and controllers of the anti-slugging advanced control system of the present invention.

The Advanced Automated System to Control and Minimize Slugging uses the following devices shown in FIG. 2:

Downhole pressure sensors (PDG) placed on production well columns;

A pressure sensor (TPT) on the wet Christmas trees (WCT) of these wells;

A pressure sensor upstream from the production choke valve (PT-01);

Control valves—production choke valve (PV-01) controlled by the well pressure control system (PIC-01 and PIC-02), so as to eliminate slugging;

Choke valve position controller (ZIC-01), which keeps the valve at the desired position for the operation;

Maximum pressure controller downstream from the choke valve (PIC-02), acting through an override (low signal selector), ensuring the processing equipment on the platform processing plant is running at the maximum allowed pressure.

Although the system of the present invention is exemplified as applied to a producing well, the anti-slugging control system can be applied to a varied number of wells and subsea manifolds.

The following is a description of how the system works.

The anti-slugging advanced control system consists of measuring the bottom hole pressure, or optionally the pressure at the wet Christmas tree—WCT, or if none of these readings is available, measuring the pressure upstream of the production choke valve.

After this, the top-side production (choke) valve must be continuously manipulated to stabilize and keep the bottom pressure as low as possible to increase output.

A control switch (HS) may be used to select the control variable from among bottom pressure (PDG), wet Christmas tree (WCT) pressure, or the pressure upstream from the choke valve (PT-01).

The pressure control algorithm (PIC) is normally a PID (Proportional-Integral-Derivative) algorithm.

The problem to be resolved using this strategy is the following:

What is the value of the pressure controller setpoint?

The optimum setpoint will depend on the gas-lift flow used and on the composition of the well (water, gas and oil content) at the time.

The proposed innovation, as seen in FIG. 2, uses a reading of the choke valve position to define the setpoint for the pressure controller (PIC-01) via a controller ZIC-01, such as to keep the production choke valve position at around the value desired by the operator. The control algorithms used for PIC-01, ZIC-01 and PIC-02, can be either PID or ONFC (Online Neurofuzzy Controller).

The PID algorithm is the most commonly used control algorithm in the industry, and is used all over the world in industrial control systems. As the name suggests, the PID algorithm is made up of three coefficients: proportional, integral and derivative, which are varied to achieve the ideal response.

ONFC is a non-linear adaptive control algorithm that automatically adjusts its setting based on the well characteristics, as shown by Gouvêa, 2005, Carvalho et al., 2010, and Brazilian patent application BR 10 2012 027338-1.

The advantage of ONFC is that it adapts to an oil well dynamic that varies during transients (start-up and stop), as well as during its lifetime.

When a PID algorithm is used, one must periodically check its performance and adjust the settings, if required.

Another innovative characteristic of the present invention compared to controls using traditional systems is the use of a real time diagnostic system to adjust the system's parameters to improve its performance.

Figure 1:
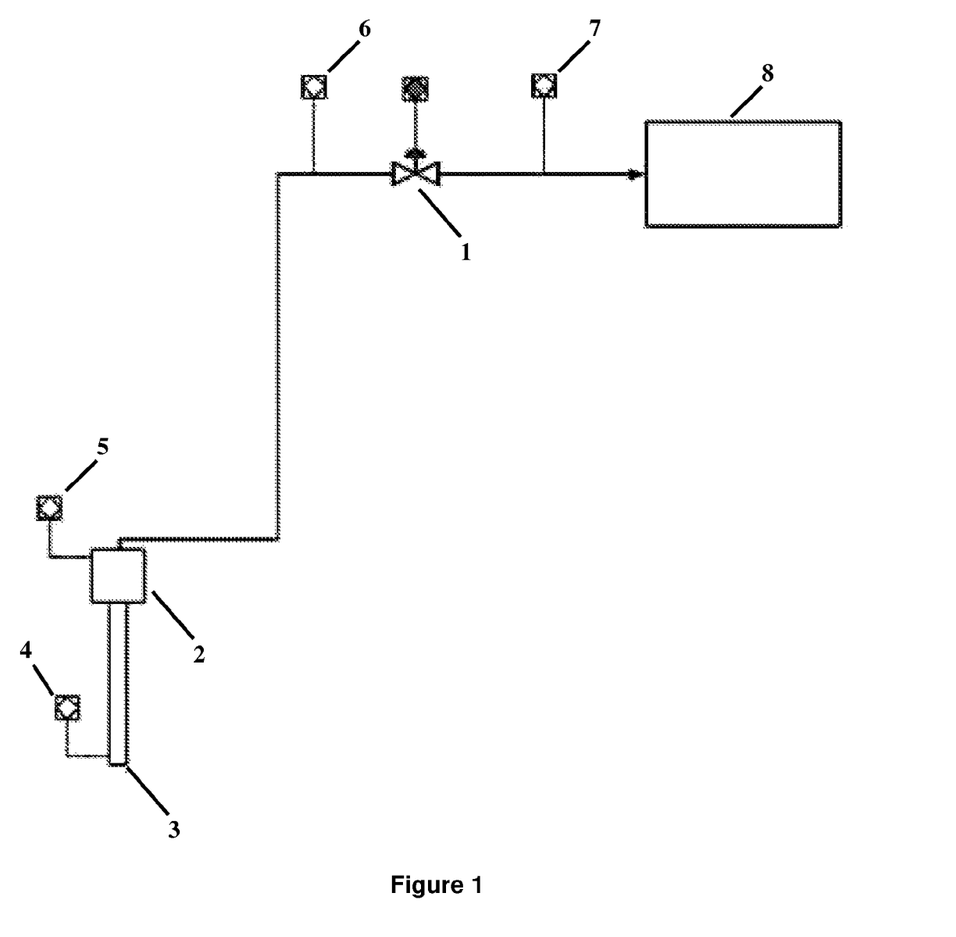
FIG. 1—shows a traditional slugging control system, where one can see the use of standard monitoring equipment and systems used in producing oil wells.

Many traditional production wells are normally equipped with monitoring sensors and equipment, often as illustrated in FIG. 1 of the present invention.

In more detail, FIG. 1 is a representation of a traditional anti-slugging control system used to control a production well, employing a production choke valve (1) on the platform (8) or wet Christmas tree (WCT) (2) (a set of valves placed on the ocean floor to control the pressure and flow of a subsea well), connected to a TPT pressure sensor (5) that measures the temperature and the pressure of the WCT (2) down to the bottom of the well (3).

A pressure sensor PDG (4) at the bottom of the well (3) is also included. Two PT pressure sensors (6 and 7) are placed, one at the arrival at the platform (8), before the choke vale, and another after the choke valve. With these readings in hand, operators attempt to define the position of the production choke valve that should be adopted (1) that will minimize slugging.

FIG. 2 is a schematic representation of the anti-slugging system of the present invention, with sensors, valves and controls placed so that there is in fact advanced and continuous control of the well's production flow, minimizing the occurrence and the damage resulting from slugging in the production flow lines.

The System of the present invention, represented in FIG. 2, uses position transmitter ZT-01 (10) to get a position reading of the production choke control valve—PV-01 (9), and deploys controller ZIC-01 (11) to keep this valve at the position desired for operation.

Choke control valve PV-01 (9) is controlled by the well pressure controllers PIC-01 (12) and PIC-02 (13).

Pressure controller PIC-02 (13), downstream of the choke valve (9), is a maximum pressure controller that acts on choke valve (9) via a low signal selector (14) to make sure the platform plant equipment (15) is operating at the maximum possible pressure. Pressure controllers PIC-02 (13) and PT-02 (16) act as override controls, or in other words, as supplementary protection in the event of very high pressure downstream from the choke valve (9).

The primary function of controller ZIC-01 (11) is to define the setpoint for pressure controller PIC-01 (12), or the target value that the automatic system of pressure controller PIC-01 (12) must reach. When operating controller ZIC-01 (11), it is convenient to have a dead band around the setpoint.

The reason for defining this setpoint is to keep the choke valve (9) position close to the value defined by the operator as the target to be reached.

An HS switch (17) allows the operator to choose the control variable, whether it will be bottom-hole pressure—PDG (18) or the pressure—TPT (19) reading of the wet Christmas tree (20), or the pressure upstream of the choke valve (9), meaning the pressure read by sensor PT-01 (21). Switch HS (17) selects the signal (PV) that will be sent to the PIC-01 (12) anti-slugging controller.

FIG. 2 also shows sensor ZT-01 (10) in a transport zone, and the pressure sensor PT-02 (16) downstream from the production choke valve (9).

Figure 3:
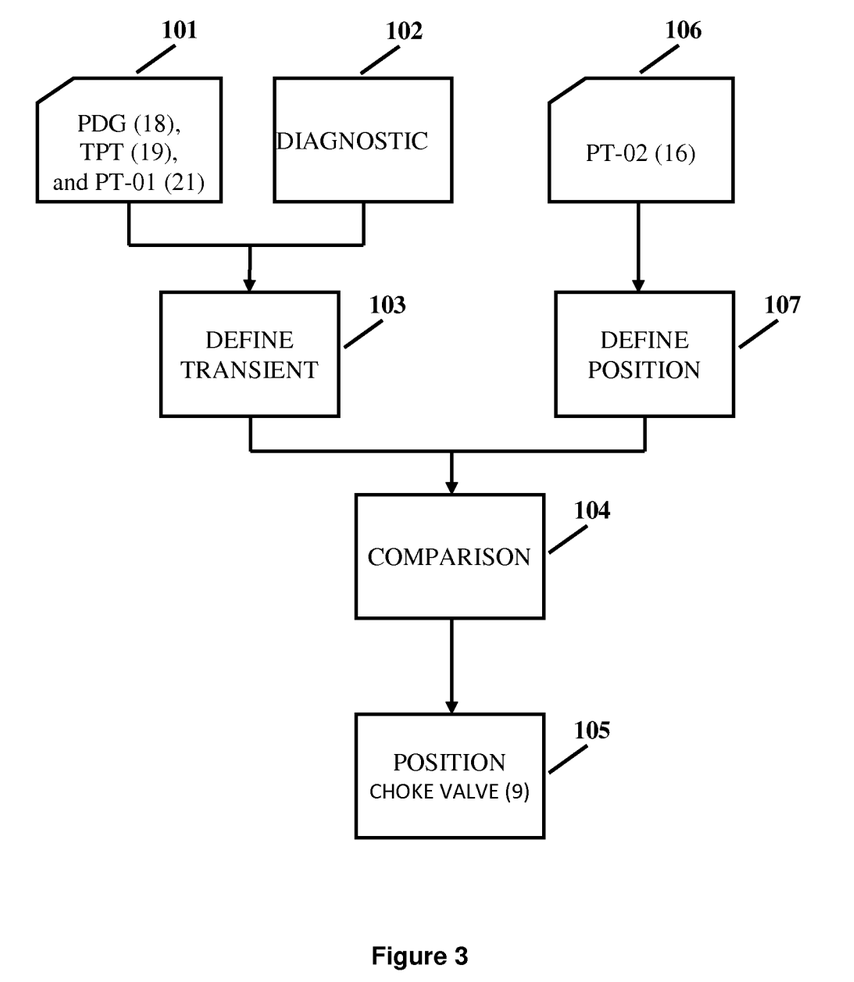
FIG. 3—shows a drawing of the control blocks associated with PIC-01, PIC-02 and ZIC-01. It is thus a block diagram of the control algorithm of the anti-slugging advanced control system.

FIG. 3 is a block diagram representing the anti-slugging advanced control system algorithm of the present invention, based on the control associated with pressure controllers PIC-01 (12) and PIC-02 (13), meaning pressure control upstream and downstream of the choke valve (9) respectively, and position controller ZIC-01 (11), which keeps choke valve (9) at the position defined by the operator, determining the setpoint of pressure controller PIC-01 (12).

The first step in the control operation consists of reading the sensor data to determine the bottom-hole pressure and the position of the choke valve (9). Thus, step (101) consists of pressure readings—PDG (18), TPT (19) and PT-01 (21), and identifying ZIC-01 (11) the choke valve (9) position.

The second step (102) consists of diagnosing the well flow status by analysing the temperature and pressure at the production system points mentioned above by applying the selected algorithm. The control algorithm used for pressure controller PIC-01 (12) is preferably a PID algorithm.

The third step (103) consists of defining the transient for the choke valve position (9) to eliminate slugging.

In the next step (104), the transients defined for the choke valve (9) that can eliminate slugging are compared, and the best position is chosen for the choke valve (9).

In the next step (105), the setting of the position for the well production choke valve (9) is sent.

In parallel, downstream from the choke valve (9) in reading step (106), a pressure reading is taken of production choke valve (9) on controller PT-02 (16).

With this reading, the next step is to define the position (107) of the choke valve (9) to avoid over-pressure upstream from production choke valve (9).

Once the position in step (107) is defined, one may proceed with steps (104) and (105), respectively selecting the best position for the choke valve (9) and sending the position for the well production choke valve (9).

Figure 4:
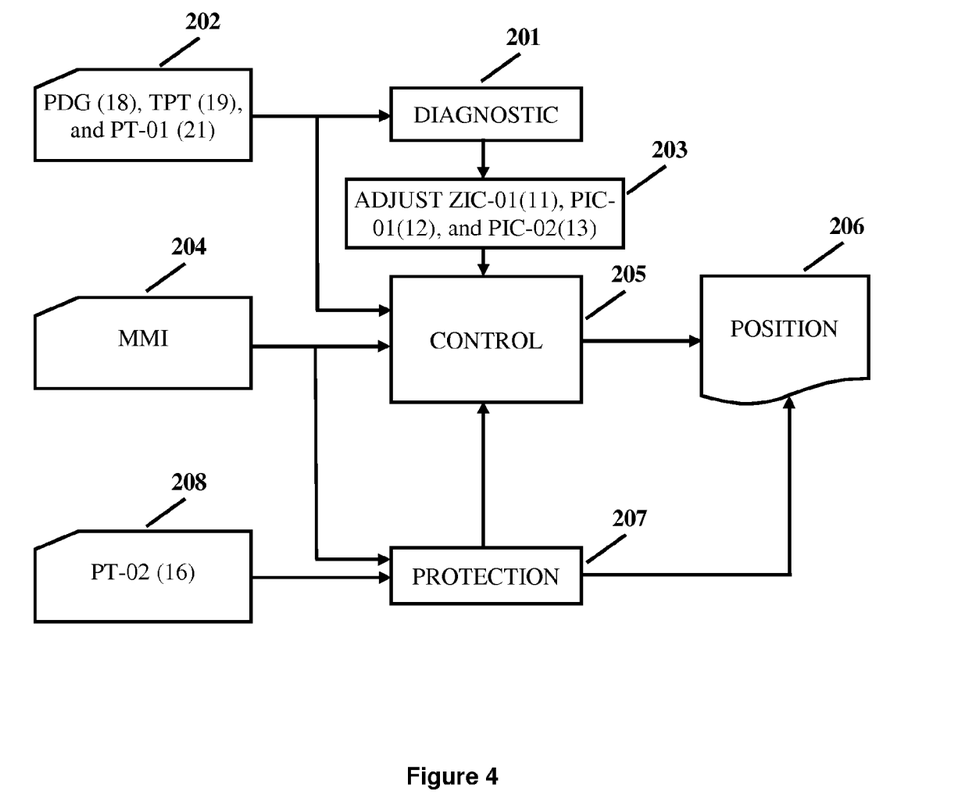
FIG. 4—shows the system architecture for the anti-slugging advanced control system. This figure shows another view of the architecture of the control blocks of the anti-slugging advanced control system.

FIG. 4 shows the system architecture for the anti-slugging advanced control system. This figure shows another view of the architecture of the control blocks of the anti-slugging advanced control system shown in FIG. 3;

This block diagram clearly shows that the goal of the initial diagnostic phase (201) is to define the standard flow of the production well by diagnosing the main control measurements (202) for the pressure reading on PDG (18), TPT (19) and PT-01 (21). Following this phase, the setting of controllers (203), ZIC-01 (11), PIC-01 (12), and PIC-02 (13) is adjusted.

In the next phase, the MMI (Man-Machine Interface) (204) is enabled to enable anti-slugging control (205), which in turn will define the new position (206) for the choke valve (9) desired by the operator to control and eliminate slugging.

The next phase is to protect the system from slugging (207), which will ensure that the pressure downstream from choke valve (9) is in the region desired for operation, with the MMI operator (204) already enabled; the pressure downstream of well PT-02 (208) is checked, and a new position (206) defined for the choke valve (9), such as to avoid overpressure upstream from production choke valve (9). This step also turns the automatic control on or off as necessary.

Figure 5:
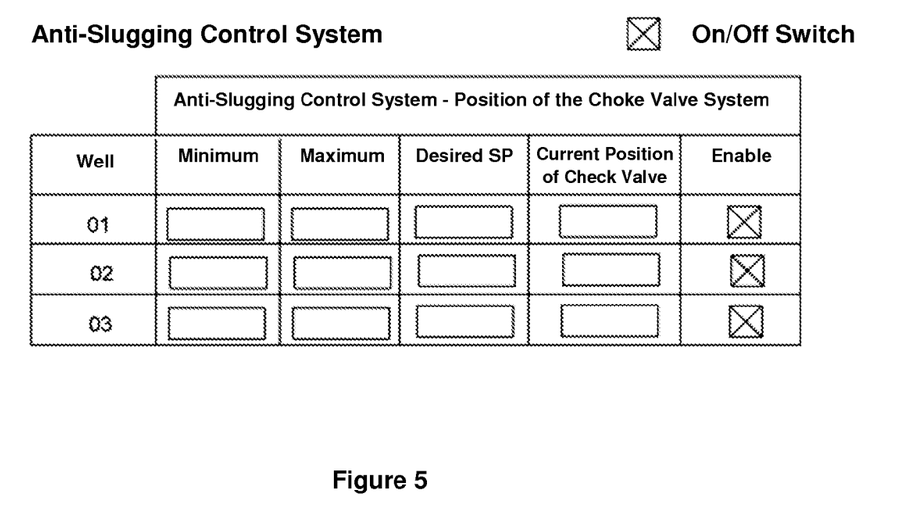
FIG. 5—shows an operational interface of the anti-slugging control.

FIG. 5 shows an operating interface for an anti-slugging control system, where a computer defines the new position desired for the choke valve (1) of each well, along with the minimum and maximum aperture limits for these production valves. It can also turn the system on or off for each individual well. This interface is implemented in the platform automation system.

The anti-slugging algorithm used to define the new position of the choke valve is preferably a PID or ONFC, more preferably an ONFC algorithm, which has the advantage of better adapting to the well dynamics, which vary during transients (start-up and stop), and during the lifetime of the well.

It will be clear from this operating interface that the system of the present invention enables monitoring and controlling several wells simultaneously and conveniently against severe slugging.

Figure 6:
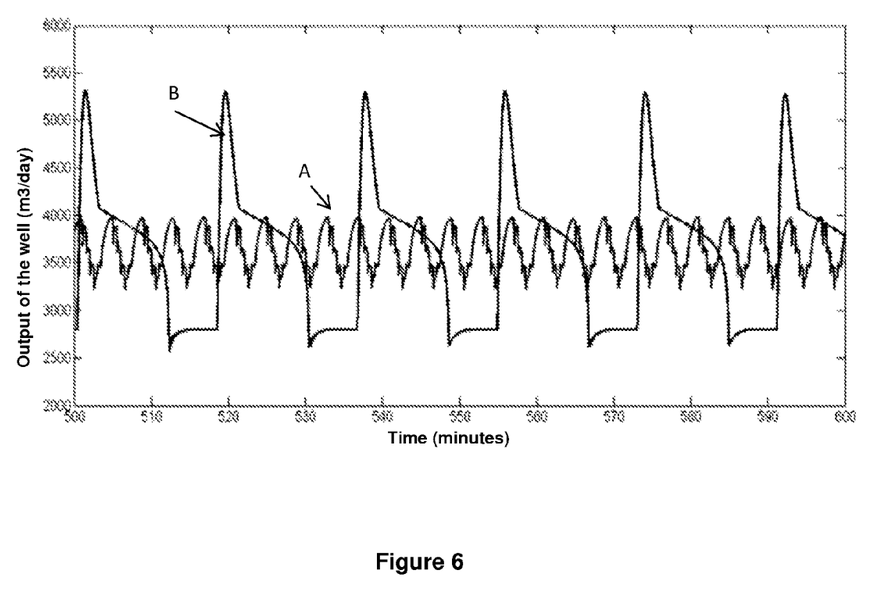
FIG. 6—is a chart showing the output of the well without (curve B, with severe slugging) and with (curve A) anti-slugging control.

FIG. 6 shows an example of the performance of the "Advanced Automatic System for Minimizing Slugging" for a simulated well.

It is clear that production using the new system is far more stable—(A) (curve with smaller peaks) compared to production without the control of the system of the present invention (B). The mean daily output was 3,662 m$^3$, about 2% higher than the mean daily output without active control (3,588 m$^3$). Therefore, although the control manipulates production choke valve (1), in this case between 70 and 100% aperture, the mean bottom pressure was minimized, resulting in an increased output.

It is important to note that this anti-slugging control will dynamically manipulate the well production choke valves (1) to eliminate slugging, always attempting to maintain the position of these choke valves (1) around the desired position for the operation, known as the ZIC-01 (10) controller setpoint.

This system also has a diagnostic device to overcome the major dynamic and time-variation of this process, adapting controller parameters to deliver the best possible performance.

The advanced well anti-slugging control system of the present invention may be very important for platform profitability (increasing output by 2 to 5%), especially in mature fields.

Another major advantage of this anti-slugging control system is increased plant stability, with less wear and tear of critical equipment (turbines, pumps and compressors), and fewer unscheduled or emergency (trip) stops of the platform.

In terms of instrumentation, the anti-slugging advanced control system requires bottom pressure sensors and the ability to automatically act on the production choke valve.

Glossary of Abbreviations

BSW—Basic sediment and water
TOG—Maximum (Total) oil/grease
PDG—Permanent downhole gauge
TPT—Temperature and pressure transducer
WCT—Wet Christmas trees
HS—control switch
PIC—pressure indicator controller
PID—Proportional, integrator, derivative control algorithm
ZIC—choke valve position controller
ONFC—online neurofuzzy control algorithm
PT—Pressure sensor
TPT—Temperature and pressure sensor
PV—flow control choke valve
HS—control switch
MMI—Man-Machine Interface

The invention claimed is:

1. An automated control system for minimizing slugs in deepwater crude oil production with severe instabilities due to slug flows, the system comprising:
   a production control choke valve (PV-01, 9);
   a controller (ZIC-01, 11) for keeping the production control choke valve (PV-01, 9) at a desired position for operation;
   an anti-slug pressure controller (PIC-01, 12) upstream of the choke valve (PV-01, 9), wherein the controller (ZIC-01, 11) is configured to define the setpoint of the anti-slug pressure controller (PIC-01, 12);
   a maximum pressure controller (PIC-02, 13), downstream from the choke valve (PV-01, 9), wherein the maximum pressure controller (PIC-02, 13) and the anti-slug pressure controller (PIC-01, 12) are configured to control the choke valve (PV-01, 9) using a low signal selector (14); and
   a control switch (HS, 17) for allowing the operator to choose a control variable and thereby select a signal (PV) being sent to the anti-slug controller (PIC-01,12), wherein the operator chooses the control variable among; a bottom hole pressure (PDG,18), a wet Christmas tree (WCT, 20) pressure (TPT, 19), and a pressure from a sensor (PT-01, 21) upstream from the choke valve (PV-01,9).

2. The system according to claim 1, wherein the maximum pressure controller (PIC-02, 13) acts as an override control, ensuring additional protection against very high pressures downstream from the choke valve (PV-01, 9).

3. The system according to claim 1, wherein the setpoint of the anti-slug pressure controller (PIC-01, 12), defined by the controller (ZIC-01, 11), is the target value for the anti-slug pressure controller (PIC-01, 12) to achieve.

4. The system according to claim 1, wherein controller (ZIC-01, 11) is configured to operate with a dead band around said setpoint.

5. The system according to claim 1, characterized by the controllers being configured to implement a method, wherein the method comprising the following steps:
   1). Identifying (101), based on sensor data, a pressure in a production well and a position of the choke valve (PV-01, 9);
   2). Diagnosing (102) a well flow status by analyzing temperature and pressure at a bottom hole permanent downhole gauge (PDG, 18), a wet Christmas tree temperature and pressure transducer (TPT, 19) and the sensor (PT-01,21) upstream from the choke valve (PV-01, 9), by using a control algorithm;
   3). Defining (103), for each control variable, the transient for the choke valve position (PV-01, 9) to eliminate slugs;
   4). Comparing the transients (104) defined for choke valve (PV-01, 9) positions that can eliminate slugs and selecting the best position for the choke valve (PV-01, 9);
   5). Sending the choke valve (PV-01, 9) position (105);
   6). Reading a pressure downstream (106) from the choke valve (PV-01, 9) on a sensor (PT-02, 16);
   7). Defining a position (107) for the choke valve (PV-01, 9) such as to avoid overpressure upstream from the choke valve (PV-01, 9);
   8). Selecting the choke valve position (104); and
   9). Sending (105) the selected choke valve position to the choke valve (PV-01, 9).

6. The system according to claim 5, characterized by the control algorithm comprises computer algorithms of PID (Proportional-Integral-Derivative) or Online Neurofuzzy Controller (ONFC) type.

7. The system according to claim 5, wherein the step of identifying (101) comprises reading the bottom-hole pressure (PDG, 18), the wet Christmas tree (WCT, 20) pressure (TPT, 19) or a pressure from a sensor (PT-01, 21) upstream from the choke valve (PV-01, 9).

8. The system according to claim 5, wherein the step of diagnosing (102) comprises using a PID algorithm.

9. The system according to claim 1, characterized by the control system being operated via an operating interface where a computer is used to define a new desired position for the choke valve (PV-01, 9).

10. The system according to claim 9, characterized by the interface defining a minimum and a maximum aperture of the choke valve (PV-01, 9).

11. The system according to claim 10, characterized by the interface being implemented in a platform automation system.

12. The system according to claim 9, characterized by the interface being used to operate the system continuously and simultaneously to monitor numerous wells against severe slugging.

13. The system according to claim 1, characterized by the mean production flow being about 2% greater than the output without active control.

14. The system according to claim 13, characterized by generating an increase in platform profitability in the order of 2 to 5% of its output.

* * * * *